United States Patent Office 3,533,979
Patented Oct. 13, 1970

3,533,979
THERMALLY CURABLE ELASTOMER COMPOSITIONS AND ADDITIVE THEREFOR
Maurice Minuto, Westport, Conn., assignor to Nylo-Thane Plastics Corp., New York, N.Y., a corporation of the United States of America
No Drawing. Continuation-in-part of application Ser. No. 440,599, Mar. 17, 1965. This application Aug. 19, 1966, Ser. No. 573,475
The portion of the term of the patent subsequent to Oct. 13, 1987, has been disclaimed
Int. Cl. C08k *11/40;* C09k *3/00*
U.S. Cl. 260—30.8   6 Claims

ABSTRACT OF THE DISCLOSURE

An additive for promoting rubber curing without increase in scroch and for low scorch vulcanization of rubber compositions of high-dienic content using a sulfur-containing curing system. The additive consists of 20 to 80 parts by weight of a toluenesulfonamide, 10 to 90 parts by weight of hexylene or octylene glycol and 1 to 10 parts by weight of a propylene glycol sebacate. The additive is employed in the composition in an amount of 0.5 to 17 parts by weight per 100 parts by weight of the rubber stock.

---

This application is a continuation-in-part of my copending application Ser. No. 440,599 filed Mar. 17, 1965, (now abandoned).

My present invention relates to vulcanizable elastomeric compositions and, more particularly, to elastomers or rubbery compositions suitable for molding, extrusion, casting or the like and represents an extension of the principles first set forth in my copending application mentioned above.

While many types of elastomeric compositions have been developed and elastomers generally can be divided into a relatively large number of classes, the compositions can be considered similar in the sense that they usually consist of a number of components which are more or less essential from the practical point of view. The elastomeric compositions thus include an elastomer (component I), a vulcanizing agent for the elastomer (component II), a vulcanization accelerator (component III) which can include a primary constituent (component IIIa) and a secondary constituent (component IIIb), and an activator (component IV) which also may consist of two constituents, namely, a fatty acid (component IVa) and a metal oxide (component IVb). If the three broad classes of neoprene, nitrile and butyl elastomers are considered, it can be stated that the nitrile-type elastomers and the neoprenes will be compounded additionally with antioxidants (component V) while butyl elastomers will include a "processing aid" (component VI); nitriles will also have an ester-type plasticizer (component VII). Neoprenes may include modifiers (component VIII) and omit the activators referred to earlier. The curing systems of the elastomers can then be considered to consist of components II–IV of the several compositions.

In general, the specific components of the curing system, i.e. the vulcanization agent, the vulcanization accelerator and the activator, and the proportions thereof are selected by the compounder in accordance with the physical properties of the elastomer desired and the use of the product composed thereof. Even the most skilled compounder frequently encounters problems arising from the tendency of the composition to "scorch" or to deteriorate during storage. Consequently, the composition must be processed ripdly with careful control of the equipment and processing variables. These latter considerations thus restrict the compounder since upon a doubling or trebling of the proportions of the curing systems in the compositions or of the proportion of vulcanizing accelerator, the composition becomes so "scorchy" or has such a poor processibility as to be unsuitable for most applications.

It is, therefore, the principal object of the present invention to provide an elastomeric composition which can be vulcanized without encountering the problems hitherto involved in the compounding and processing of similar compositions.

Another object of my invention is to extend the principles originally set forth in my copending application mentioned above to other elastomer systems.

Yet a further object of the present invention is to provide an improved elastomeric composition which can be vulcanized in a fraction of the time required for conventional compositions. Another object of this invention is to provide an improved rubber composition including an additive which permits a reduction in the proportion of vulcanizing agent and, when fully compounded with the usual accelerators, antioxidants and vulcanizing agents, has an unusually long shelf live.

Still another object of this invention is to provide a vulcanizable composition having an improved softness facilitating the melting of the formulation but which leaves the ultimate hardness of the vulcanized end products unimpaired, which has improved flow characteristics facilitating the extrusion and injection molding of the composition and enables the distribution of the material in multicavity molds, and which is free from discoloration either in a transparent or opaque state.

It has been found that rubber compositions, whether natural or synthetic, and including conventional compounding ingredients including vulcanizing agent, antioxidants, accelerators, softeners, fillers, pigments and the like, may have various characteristics thereof substantially improved upon adding to such composition additives of a multifunctional nature.

Thus, it has been found that toluene sulfonamides when mixed with octylene glycol, provide a composite additive, which when combined with conventional rubber formulations, vastly improves the molding characteristics of the formulation; reduces vulcanization time and permits a reduction in the proportion of sulfur normally used as a vulcanizing agent in such formulations.

The toluene sulfonamide may be any one or a combination of N-ethyl o- and p-toluene sulfonamide; N-ethyl p-toluene sulfonamide; o- and p-toluene sulfonamide; or N-cyclohexyl p-toluene sulfonamide. The toluene sulfonamide forms a major proportion of the composite additive and the alkylene glycol a minor proportion thereof. The alkylene glycol (preferably hexylene or octylene glycol) component appears to have an activating effect upon the composition; according to a principal feature of the invention, the composite additive also includes small amounts of one or more long-chain polybasic acids esterified with polyhydric alcohols such as glycerol or ethylene glycol, the latter compound having surprising retardant properties when used in the additive composition indicated. The composite additive may be consituted of from 20 to 80 parts of a selected toluene sulfonamide or mixture thereof and from 10 to 90 parts of alkylene glycol, all by weight. Also, such additive includes about 1–10 parts by weight of Paraplex G25 (polypropyleneglycol sebacate, Rohm & Haas) as the long-chain polybasic acid ester. Preferably 60 to 75 parts of the sulfonamide is mixed with 25–40 parts of octylene glycol, and, say, 5 parts of the long chain ester to form the additive. The composite additive is admixed with conventional formulations of synthetic or other elastomers, wherein the usual vulcanizing agent, antioxidant, accelerator, softeners, fillers, pigment and the like, are present. The usual proportion of sulfur may be decreased since it has been found that the composite additive permits the formulation to be vulcanized with decreased amounts of sulfur, yet providing an excellent end product.

Thus it can be stated that the additive of the present invention, consisting of a sulfonamide component, an octylene glycol component and generally a long-chain ester component, should be present in an amount ranging from 0.5 to 17% by weight of the elastomer content of the composition and preferably from 2 or 2.5 parts by weight to 10 or 12 parts by weight of the additive per 100 parts by weight of the elastomer. The additive, when added prior to milling so that it is throughly and homogeneously distributed in the composition, yields a vulcanizable mass which does not scorch or "set up" at a rate greater than that characterizing the same compositions without the additive even when the cooling systems are increased in proportion to the elastomer (e.g. by doubling or trebling the proportion of vulcanizing agent and/or accelerator). The elastomeric compositions of the present invention have been found to be safely treated even at elevated temperatures, possibly because the additive acts as a retarder at temperatures up to 200° F. (in some cases up to 250° F). Above these temperatures the composition cures at a rate generally 10% to 50% greater than the normal rate while the physical properties of the vulcanized product are equal to or better than those of the compound vulcanized without the additive. Moreover, the additive is nonflammable, nontoxic, nonallergenic and nonexplosive so that it can be readily handled safely by machine operators and other personnel of the plant. In proportions up to 3% (by weight of the elastomer component, i.e. component I), the additive can be milled into the composition in small increments whereas larger amounts (up to 7%) can be added when, where naphthalenic or processing oils are used, the additive replaces twice the weight proportion of these oils.

It has been found that the compound additive of the present invention is a powerful plasticizer in addition to having retarded effects at temperatures below 250° F. and accelerator effects at temperatures thereabove. An excess of the additive will, consequently, yield a softer material with greater elongability and lower tensile strength.

The invention will be described in greater detail hereinafter with reference to a series of examples illustrating how the principles may be applied to various elastomeric compositions:

EXAMPLE 1

| | Parts by weight |
|---|---|
| #1 smoked sheet rubber | 100.0 |
| Stearic acid | 1.0 |
| Zinc oxide | 5.0 |
| Antioxidant (phenyl naphthylamine) | 1.0 |
| Accelerator (benzothiazyl disulfide) | 1.0 |
| Filler | 20.0 |
| Clay | 30.0 |
| Petroleum light oil | 20.0 |
| Sulfur | 2.0 |
| Ultramarine blue pigment | 0.3 |
| Titanium dioxide | 5.0 |
| Additive | 2.0 |

The additive in Example 1 is made by mixing 75 parts by weight of N-ethyl o- and p-toluene sulfonamides with 20 parts by weight of octylene glycol and 5 parts Paraplex G25.

The ingredients including the additive, were milled in the usual manner and sheeted out. The sheet was found to have a long shelf life and was readily converted into molded products in large multicavity molds. It was found that the composition had excellent flow characteristics in the mold, closely simulating the conventional thermoplastic synthetic resins. Furthermore, the molded products were free from discoloration.

EXAMPLE 2

| | Parts by weight |
|---|---|
| Hycar 1011 (butadiene-acrylonitrile copolymer) | 100.0 |
| Zinc oxide | 5.0 |
| Stearic acid | 2.0 |
| Sulfur | 3.0 |
| Filler | 100.0 |
| Accelerator (zinc dimethyl dithiocarbamate) | 3.2 |
| Antioxidant (polymerized trimethyl dihydroxyquinoline | 1.0 |
| Additive | 3.0 |

In the above example, the additive was constituted of 60 parts by weight of o- and p-toluene sulfonamide, 35 parts by weight of octylene glycol and 5 parts by weight of Paraplex G-25. The above formulation was readily compounded and provided excellent molded products. It was found that with a decrease in sulfur content, the formulation could be vulcanized at a given vulcanizing temperature in a fraction of the time normally required with usual amounts of sulfur, at said temperature.

EXAMPLE 3

| | Parts by weight |
|---|---|
| Synthetic rubber (butadiene-styrene copolymer) | 45.0 |
| Synthetic rubber (butadiene-acrylonitrile copolymer) | 5.0 |
| Neoprene (2-chloro-butadiene 1, 3 polymer) | 5.0 |
| Stearic acid | 1.5 |
| Cumar resin [1] | 6.75 |
| Petrolatum | 3.0 |
| Zinc oxide | 3.75 |
| Sulfur | 2.5 |
| Antioxidant | 0.75 |
| Accelerator | 1.25 |
| Clay | 11.25 |
| Additive | 3.5 |

[1] Paracoumarone-indene resin (Allied Chemical Co.).

The additive in the above Example 3 was a mixture of 60 parts by weight of N-cyclohexyl p-toluene sulfonamide, 35 parts by weight of octylene glycol and 5 parts by weight Paraplex G25. The formation was milled readily and speedily. When sheeted, the formulation had excellent shelf life and was readily molded in large multicavity molds with good flow characteristics in all cavities irrespective of their location.

It has been found that the composite additive when added to conventional natural or synthetic rubber formulations including a sulfur vulcanizing agent, permitted a reduction in the amount of sulfur normally used, and further, vulcanized in a much shorter time period. Thus, where the normal vulcanizing time for a given formulation at a temperature of 320° F. was about 6 minutes; the use of the composite additive allowed the same formulation to be vulcanized at the same temperature in about 50–75 seconds.

When the composite additive of Examples 1–3 was used in proportions of from 0.5 to 12.0 parts by weight for 100 parts by weight of the synthetic or natural rubber, results similar to those indicated where obtained. It has been found that with the composite additive, the normal proportion of sulfur may be reduced to as little as 1.0 part per 100 parts of rubber. Substitution of hexylene glycol for the octylene glycol of Examples 1–3 also yielded similar results.

EXAMPLE 4

Injection-molding formula used for making bib washers.

|  |  | Parts by weight |
|---|---|---|
| SBR 1605 [1] | (RHC 50) | 75.0 |
| Goodrite 2057 a styrene-butadiene resin described at page 686, of Compounding Ingredients for Rubber, Third Edition, Rubber World, New York, 1961 | (RHC 37.5) 100 | 75.0 |
| Buna N | (RHC 12.5) | 12.5 |
| Stearic acid |  | 2.5 |
| Cumar resin |  | 11.25 |
| Zinc oxide |  | 6.25 |
| Heliozone [2] |  | 2.5 |
| Agerite Resin D [3] |  | 1.25 |
| DOTG [4] |  | 6.25 |
| Altax [5] |  | 5.0 |
| Zeolex 23 [6] |  | 75.0 |
| Hard clay |  | 18.75 |
| Petrolatum |  | 5.0 |
| Light oil |  | 20.0 |
| Sulfur |  | 3.0 |
| Additive (Example 1) |  | 16.25 |
|  |  | 339.50 |

[1] Buna S rubber stock.
[2] Petrolatum Waxes.
[3] Polymerized trimethyldihydroquinoline.
[4] Di-orthotolylguanidine.
[5] Benzothiazyl disulfide.
[6] Precipitated sodium silicoaluminates.

The above composition was milled in the usual manner and molded in a multi-cavity injection-molding machine having a 20-second cycle with injection of the composition at 310° F. The bodies were fully vulcanized without discoloration. When the additive of the present invention was omitted, however, the washers were found to be incompletely vulcanized upon formation with a 20-second cycle at this temperature.

EXAMPLE 5

Extrusion formula used for making profiled rods.

| SBR 1605 | (RHC 50) |  | 75.0 |
|---|---|---|---|
| Goodrite 2057 | (RHC 37.5) | 100 | 75.0 |
| Buna N | (RHC 12.5) |  | 12.5 |
| Stearic acid |  |  | 2.5 |
| Cumar resin |  |  | 11.25 |
| Zinc oxide |  |  | 6.25 |
| Heliozone |  |  | 2.5 |
| Agerite Resin D |  |  | 1.25 |
| DOTG |  |  | 6.25 |
| Altax |  |  | 5.0 |
| Zeolex 23 |  |  | 75.0 |
| Hard clay |  |  | 18.75 |
| Petrolatum |  |  | 5.0 |
| Light oil |  |  | 20.0 |
| Sulfur |  |  | 3.0 |
| Additive (Example 1) |  |  | 7.5 |
|  |  |  | 330.75 |

The foregoing extrusion formula was milled in the usual manner and extruded through a dye which opened into a vulcanizing chamber attached to the extruder at its head. The extruded rod passed through the vulcanizing chamber at a rate ensuring a 60 cycle dwell in the chamber which was maintained at a temperature of 310° F.; curing was complete in this period. When the additive of the present invention was omitted, however, the rod emerged incompletely cured. In both Examples 4 and 5, the proportion of additive was reduced to 0.5 part per 100 parts of elastomer and, while a corresponding increase in the cooling time was necessary, nevertheless a substantial improvement in the scorch qualities and rate of vulcanization were observed. Substitution of hexylene glycol for the octylene glycol of the additive yielded similar results.

EXAMPLE 6a

Extrusion formula

|  | Parts by weight |
|---|---|
| Neoprene Type W | 100.0 |
| Stearic acid | 1.0 |
| Agerite Gel [1] | 1.0 |
| Paraffin | 2.0 |
| Petrolatum | 2.0 |
| Light process oil | 15.0 |
| Cumar MH 2½ [2] | 5.0 |
| Thermax [3] | 25.0 |
| FEF Black [4] | 25.0 |
| HAF Black [5] | 25.0 |
| Thiate B [6] | 0.5 |
| Magnesia | 4.0 |
| Zinc oxide | 5.0 |
|  | 210.5 |

[1] Ditolylamines + petroleum wax.
[2] Rubber grade para-coumarone-indene resin.
[3] Thermatomic carbon (carbon black).
[4] Fast-extruding furnace black.
[5] High-abrasion furnace black.
[6] Thiolhydropyrimidines.

The foregoing composition was prepared as an example of a neoprene system. The composition was melted in the usual manner and extruded with a press cure of 20 minutes at 307° F. after extrusion. After this period, vulcanization appeared to be complete. When 7.5% of the additive of Example 2 was substituted for the 15 parts by weight of light-process oil, curing was accomplished at the same temperature in only 60 seconds. Again a highly accelerated curing was obtained by comparison with the system free from the additive even when the latter was present only in an amount of 0.5 part by weight per 100 parts of the elastomer. At 12.5 parts by weight of the additive per 100 parts of the elastomer, the composition cured still more rapidly without substantial softening of the product.

When the sulfonamide content was increased to 80 parts per weight, the octylene glycol content reduced to 10 parts by weight and the long-chain ester raised to 10 parts by weight, similar results were obtained. Corresponding tests were carried out with the following neoprene base stocks and yielded results corresponding to those enumerated under Example 6a for similar proportions of the same additive.

EXAMPLE 6b

|  | Parts by weight |
|---|---|
| Neoprene GN | 100.0 |
| Magnesia (lightly calcined) | 4.0 |
| Zinc oxide | 5.0 |
| Agerite Stalite [1] | 2.0 |
| Stearic acid | .5 |
| Altax | .5 |
|  | 112.0 |

[1] Alkylated diphenyl amines.

EXAMPLE 6c

|  | Parts by weight |
|---|---|
| Neoprene W | 100.0 |
| Magnesia | 4.0 |
| Zinc oxide | 5.0 |
| Thiate (A or B) | 1.0 |
| Agerite Stalite | 2.0 |
| Stearic acid | .5 |
|  | 112.5 |

EXAMPLE 6d

| | Parts by weight |
|---|---|
| Magnesia | 4.0 |
| Zinc oxide | 5.0 |
| DPT [1] | .5 |
| NA 22 [2] | 1.0 |
| Agerite Stalite | 2.0 |
| Stearic acid | .5 |
| Aromatic oil | 10.0 |
| | 123.0 |

[1] Diphenyl-diguanidine.
[2] 2-mercaptoimidazoline.

EXAMPLE 6e

| | Parts by weight |
|---|---|
| Neoprene W | 100.0 |
| Magnesia | 4.0 |
| Zinc oxide | 5.0 |
| Sulfur | 1.0 |
| DOTG | .5 |
| NA 22 | .6 |
| Thionex [1] | .5 |
| Agerite | 2.0 |
| Stearic acid | .5 |
| Aromatic oil | 10.0 |
| | 124.10 |

[1] Tetramethylthiuram monosulfide accelerator.

EXAMPLE 7a

Pneumatic-tire tread stock

| | Parts by weight |
|---|---|
| #1 smoked sheet rubber | 100.0 |
| Reogen [1] | 1.0 |
| Stearic acid | 3.0 |
| Zinc oxide | 3.0 |
| Agerite Resin D | 1.0 |
| Agerite HP [2] | 1.0 |
| Micronex W6 [3] | 40.0 |
| Philblack O [4] | 10.0 |
| Paraflux X [5] | 3.0 |
| Sulfur | 2.5 |
| Amax [6] | 0.9 |
| Altax | 0.15 |

[1] Plasticizer-paraffin oil/sulfonic acid mixture.
[2] Antioxidant (phenyl-betanaphthylamine+isopropoxy-diphenylamine+diphenyl-p-phenylenediamine).
[3] Easy-processing channel carbon black.
[4] Carbon black.
[5] Asphaltic resin (C. P. Hall Co.).
[6] n-Epoxy-diethylene benzothiazol sulfonimide.

The foregoing pneumatic-tire tread stock served as the base compound for a multiplicity of standard tests. The stock, when vulcanized for 5 minutes at 320° F. evidenced a tensile strength of 145 p.s.i., an elongation of 370% and a Durometer A rating of 48. When 2 parts by weight of the additive of Example 1 were incorporated in the base stock, the tensile strength rose to 1913 p.s.i. the elongation to 500% and the Durometer A rating to 57 with the same vulcanization conditions. When 4 parts by weight of the additive were used, a tensile strength of 1529 p.s.i., an elongation of 650% and a Durometer A rating of 52 were obtained.

The same stock vulcanized for 5 minutes at the indicated temperature had a tensile strength of 293 p.s.i, an elongation of 620% and a Durometer A rating of 52. When, however, 2 parts of the additive of Example 1 were employed, the tensile strength was found to be 1845 p.s.i., the elongation was 560% and the Durometer A rating 58. A tensile strength of 1714 p.s.i. an elongation of 670% and a Durometer A value of 57 were observed when 4 parts by weight of the additive was used.

EXAMPLE 7b

Using the stock of Example 7a when omitting the accelerator component so that a hard-rubber base consisting essentially of elastomer, sulfur and powder component was obtained, the provision of 2 parts by weight of the additive of Example 1 markedly increased the physical properties of the elastomer. For example, when SBR rubber was used with a vulcanization at 360° F. for 15 minutes, the composition containing 2 parts of the additive per 100 parts of elastomer had a tensile strength of 6582 p.s.i. whereas the composition omitting the additive had a tensile strength of 4165 p.s.i. Under similar conditions, with a natural rubber elastomer, the composition containing the additive had a tensile strength of 5149 whereas the composition free from additive had a tensile strength of 4395 p.s.i. Similar Durometer D hardness values were obtained.

EXAMPLE 7c

A semipneumatic tire compound was prepared using the basic sock of Example 7a accelerated with Altax, DOTG, methyl zymate and including 4% of the additive of Example 1 in the manner previously described. After curing in a tire mold at 360° F., the following ratings were obtained:

MOONEY SCORCH TEST

| MS$^5$–210° F | 15 min | No scorch. |
|---|---|---|
| MS$^5$–250° F | 4 min. 9 sec | No scorch. |

With sulfur replacing metal zymate, the Mooney Scorch, Test with 7.5 parts of the additive gave values of

| 210° F | 14.3 min | No scorch. |
|---|---|---|
| 250° F | 3.7 min | No scorch. |

EXAMPLE 8a

| | Parts by weight |
|---|---|
| (I) Smoked sheet | 100.0 |
| (II) Sulfur | 2.75 |
| (III): | |
|   (a) Altax | 1.0 |
|   (b) Methyl Tuads [1] | .1 |
| (IV): | |
|   (a) Stearic acid | 2.0 |
|   (b) Zinc oxide | 5.0 |
| (V) Agerite Stalite | 1.0 |
| | 111.85 |

[1] Tetramethylthiuram disulfide accelerator and vulcanizing agent (R. T. Vanderbilt Co.).

EXAMPLE 8b

| | Parts by weight |
|---|---|
| (I) Smoked sheet | 100.0 |
| (II) Sulfur | 2.5 |
| (III): | |
|   (a) Methyl zymate | .1 |
|   (b) MBTS [1] | 1.5 |
| (IV): | |
|   (a) Stearic acid | 1.0 |
|   (b) Zinc oxide | 5.0 |
| (V) Agerite Stalite | 2.0 |
| | 112.10 |

[1] Benzothiazyl disulfide.

EXAMPLE 8c

| | Parts by weight |
|---|---|
| (I) SBR (Type 1500) | 100.0 |
| (II) Sulfur | 2.0 |
| (III): | |
|   (a) Altax [1] | 1.5 |
|   (b) Cumate | .1 |
| (IV): | |
|   (a) Stearic acid | 2.0 |
|   (b) Zinc oxide | 5.0 |
| (V) Agerite Stalite | 1.0 |
| | 11.6 |

[1] Benzothiazyl disulfide.

EXAMPLE 8d

| | Parts by weight |
|---|---|
| (I) SBR 1500 | 100.0 |
| (II) Sulfur | 2.0 |
| (III): | |
| (a) MBTS | 1.5 |
| (b) Thionex [1] | .5 |
| (IV): | |
| (a) Stearic acid | 2.0 |
| (b) Zinc oxide | 5.0 |
| (V) Agerite Stalite | 2.0 |
| | 113.0 |

[1] Tetramethylthiuram monosulfide accelerator (E. I. du Pont).

The compositions of Examples 8a–8d were admixed with 0.5, 1, 2, 4, 7.5, 10, 12 and 15 parts by weight of the additive of Example 1 as described in Examples 7a–7c. In all cases, a marked improvement in the rate of curing was obtained and it was possible to reduce substantially the accelerator component without loss of curing speed. Moreover, a greatly extended shelf time and improved processability was observed. When hexylene glycol was substituted for the octylen glycol of this additive, the results were basically unchanged.

EXAMPLE 9a

Butyl synthetic elastomer compositions:

| | Parts by weight |
|---|---|
| (I) Butyl 217 | 100.0 |
| (II) Sulfur | 2.0 |
| (III): | |
| (a) Methyl Tuads | 1.0 |
| (b) Captax [1] | .5 |
| (c) Tellurac [2] | 1.0 |
| (IV): | |
| (a) Zinc oxide | 5.0 |
| (b) Stearic acid | 1.0 |
| (VI) Paraffin | 2.0 |
| | 112.5 |

[1] 2-mercaptobenzothiazol.
[2] Tellurium diethyl-dithiocarbamate.

EXAMPLE 9b

| | Parts by weight |
|---|---|
| (I) Butyl 5000 NS | 100.0 |
| (II) Sulfur | 2.0 |
| (III): | |
| (a) MBT [1] | 1.0 |
| (b) TMTD [2] | 2.0 |
| (IV): | |
| (a) Zinc oxide | 10.0 |
| (b) Stearic acid | 1.0 |
| (VI) Flexon 765 [3] | 20.0 |
| | 136.0 |

[1] 2-mercaptobenzothiazol.
[2] Tetramethylthiuram disulfide.
[3] Phenyl/p-phenylene diamine.

EXAMPLE 9c

| | Parts by weight |
|---|---|
| (I) Butyl 5000 NS | 100.0 |
| (II) Red lead | 6.0 |
| (III): | |
| (a) GMF [1] | 2.0 |
| (b) MBTS [2] | 4.0 |
| (IV) Stearic acid | 1.0 |
| (VI) Flexon 765 | 20.0 |
| | 133.0 |

[1] p-Quinone dioxime.
[2] Benzothiazyl disulfide.

Each of the foregoing compositions was milled together with each of the additives described in Examples 1–3 at 2 parts by weight of the additive, 5 parts by weight and 12 parts by weight. In each case, conventional curing methods resulted in compositions which evidenced higher Durometer readings and improved tear and wear resistance and tensile strength. It was also found that there was no tendency toward deterioration at temperatures of up to 200° F., presumably because of a retardation quality of the additive below this temperature. When the additive was employed, a substantial reduction in the proportion of accelerator was possible.

EXAMPLE 10a

| | Parts by weight |
|---|---|
| (I) Acrylonitrile-containing rubber stock (Hycar of Example 2) | 100.0 |
| (II) Sulfur | 1.75 |
| (III): | |
| (a) Altax | 1.5 |
| (b) Methyl Tuads | .1 |
| (IV): | |
| (a) Stearic acid | 1.0 |
| (b) Zinc oxide | 5.0 |
| (V) Agerite White [1] | 2.0 |
| (VII): | |
| (a) Dibutyl sebacate | 15.0 |
| (b) Tributoxy ethyl phosphate | 15.0 |
| | 141.35 |

[1] Sym-di-beta-naphthyl-para phenylenediamine.

EXAMPLE 10b

| | Parts by weight |
|---|---|
| (I) Hycar (Example 2) | 100.0 |
| (II) Sulfur | 2.0 |
| (III): | |
| (a) MBTS | 1.5 |
| (b) TMTD | .15 |
| (IV): | |
| (a) Stearic acid | 1.0 |
| (b) Zinc oxide | 5.0 |
| (V) Agerite White | 2.0 |
| (VII) Plasticizer 8C [1] | 10.0 |
| | 121.65 |

[1] Vegetable oil fatty acid triglycol ester.

EXAMPLE 10c

| | Parts by weight |
|---|---|
| (I) Hycar (Example 2) | 100.0 |
| (II) Sulfur | .5 |
| (III): | |
| (a) MBTS [1] | 1.5 |
| (b) TMTD | 1.5 |
| (IV): | |
| (a) Stearic acid | 1.0 |
| (b) Zinc oxide | 5.0 |
| (V) Agerite White | 2.0 |
| (VII) Plasticizer 8C | 10.0 |
| | 121.50 |

[1] Benzothiazyl disulfide.

Each of the aforementioned synthetic elastomer formulations was admixed with 0.5, 2, 5, 10 and 12 parts by weight of each of the additives of Examples 1–3. Moreover, hexylene glycol was substituted for the octylene glycol in a second series of tests as indicated. When the compositions were cured at their usual temperatures, higher tensile strength and Durometer readings were obtained in most cases whereas curing could be carried out at a fraction of the normal time. It was possible, moreover, to sharply increase the accelerator component without materially endangering the processability of shelf life of the composition containing the additive.

EXAMPLE 11

|  | A | B |
|---|---|---|
| Smoked sheet | 100.0 | 100.0 |
| Plasticizer | 20.0 | 20.0 |
| Zinc oxide | 15.0 | 15.0 |
| Stearic acid | .5 | .5 |
| Agerite Resin D | 1.0 | 1.0 |
| Whiting (precipitated) | 25.0 | 25.0 |
| Sulfur | 2.0 | |
| Captax | .5 | |
| Butyl Eight [1] | | 4.0 |
| Color master batch | | 2.0 |
| Total | 164.0 | 167.5 |
| | | 331.5 |

[1] Dithiocarbamate accelerator.

The above composition constitutes a 2-part system for a self-curing soft rubber of the type commonly produced in the so-called "split-batch" process. When the two components (A and B) are blended together, the exothermic reaction permits self-curing although scorch commonly accompanies the blending and curing step. Using the same components, to which 4 parts of the additive of Example 1 are added, a self-vulcanizing single batch is obtained with scorch and processing safety.

The present invention has been found to be applicable to rubber stock of the type commonly used in pneumatic tires, conveyor and transmission belts, wound and extruded hose and tubing, molded products, encapsulating sheets and layers, wire and cable insulation, rubber footwear, elastomeric soles and heels of shoes and boots, chemically blown and expanded sponge, hard rubber and the like.

Surprisingly, the present invention has also found application with thermally set or fixed developer powders of the type employed for developing electrostatic images with the use of heat. Such powders generally include a carrier material or base of a thermoplastic or thermally curable material which may be a natural or synthetic elastomer. When 0.5–12 parts of the additive of Examples 1–3 were admixed with the elastomeric components of the several developers described in U.S. Pat. No. 2,618,551, for example, it was found that the fixing step markedly improved the image contrast. While I do not wish to be bound by any theory in this connection, it may be suggested that the additive facilitates curing and setting of the elastomer without discoloration and improves the uniformity of the film applied to the carrier sheet. Whatever the reason, the additive is highly effective in improving image contrast and the overall clearness of development when used with xerographic and electrostatic images.

It has been found that the additive yields results similar to those already described with blends containing reclaim together with SBR and natural rubber, with terpolymers of alkylenes and dienic resins, as well as with acrylic, polysulfide butadiene, polyethylene, isoprene and urethane polymers.

In order to test the effectiveness of the additive in compositions to be subjected to strenuous wear, slabs of rubber accepted by government institutions for the soles and heels of military boots were prepared without the additive (standard composition 66–SBR 111, below) with 2 parts by weight of the additive of Example 1 (composition No. 112) and with double accelerator component with the same proportion of additive (composition 113).

TABLE 1

| Composition: 66 SBR | 111 | 112 | 113 |
|---|---|---|---|
| | Parts by weight | | |
| SBR 1502 [a] | 90.0 | 90.0 | 90.0 |
| EPT, Royalene X400 [b] | 20.0 | 20.0 | 20.0 |
| Hy-Sil 233 [c] | 50.0 | 50.0 | 50.0 |
| EPC Black [d] | 3.0 | 3.0 | 3.0 |
| Agerite Resin D [e] | 1.0 | 1.0 | 1.0 |
| Flexzone 3C [f] | 1.5 | 1.5 | 1.5 |
| UOP 88 [g] | 1.0 | 1.0 | 1.0 |
| Sundex 53 [h] | 10.0 | 10.0 | 10.0 |
| Stearic acid | 1.0 | 1.0 | 1.0 |
| Captax [i] | 1.5 | 1.5 | 3.0 |
| DOTG | 2.0 | 2.0 | 4.0 |
| Methazate [j] | 1.0 | 1.0 | 2.0 |
| Sulfur, Spidex | 2.0 | 2.0 | 1.8 |
| Additive (Example 1) | None | 2.0 | 2.0 |

[a] Styrene-butadiene rubber (see page 598, Compounding Ingredients For Rubber, Third Edition, Rubber World, New York, 1961).
[b] Oil extended gum rubber (op-cit.).
[c] Hydrated silica (op. cit., page 318).
[d] Easy Processing Channel Black (page 278, op. cit.).
[e] Polymerized trimethylhydroxyquinoline (page 117, op. cit.).
[f] N-isopropyl-N-phenyl-p-phenylenediamine (page 125, op. cit.).
[g] N,N'-bis(1-ethyl-3-methylpentyl-N)-p-phenylenediamine (page 139, op. cit.).
[h] Aromatic oil (page 232, op. cit.).
[i] 2-mercaptobenzothiazole (page 34, op. cit.).
[j] Zinc dimethyldithiocarbamate (page 43, op. cit.).

The slabs tested for tensile properties were cured at 307° F. for 2 minutes, 5 minutes and 10 minutes. A test of "cut growth" was made with slabs cured at this temperature for 10 minutes while abrasion pellets were prepared in the usual manner by curing at 307° F. for 10 minutes. In all cases, standard testing procedures were used. The cut-growth test involved the study of the increase of a perforation made in the cut-growth slabs by a pin stressed through the number of flexes indicated. The test results are indicated in Table 2.

TABLE 2.—PHYSICAL PROPERTIES

| Compound No. (standard) 66 SBR | 111 307° F. | | | 112 307° F. | | | 113 307° F. | | |
|---|---|---|---|---|---|---|---|---|---|
| Cure temperature: | | | | | | | | | |
| Cure time, minutes: | 2 | 5 | 10 | 2 | 5 | 10 | 2 | 5 | 10 |
| Original Properties: | | | | | | | | | |
| Tensile strength, p.s.i | 1390 | 2150 | 2630 | 1500 | 2149 | 2630 | 2510 | 2580 | 2540 |
| Ult. elong., percent | 1020 | 940 | 910 | 1050 | 920 | 920 | 890 | 820 | 800 |
| Mod. at 300% elong., p.s.i | 240 | 330 | 410 | 200 | 340 | 350 | 530 | 460 | 500 |
| Hard. Shore A: | | | | | | | | | |
| Original | | | 58 | | | 59 | | | 60 | | | 55 | | | 56 | | | 57 | | | 60 | | | 60 | | | 60 |
| After 70 hrs./212° F | | | 69 | | | 68 | | | 65 |
| Abrasive Index: | | | | | | | | | |
| Original | | | 78 | | | 69 | | | 75 |
| After 70 hrs./212° F | | | 138 | | | 128 | | | 96 |
| Cutgrowth, percent, after 50,000 flexes: | | | | | | | | | |
| Aged 7. hrs./212° F | | | 100 | | | 100 | | | 50 |

From the table it can be seen that the tensile strength of the composition containing the additive exceeded that of the standard while an improved elongation percentile was obtained under most circumstances. Even when the accelerator component was doubled (composition 113), the cut growth was found to be better than that of the standard as a result of the inclusion of the additive. The processability and shelf life of the product, even with double proportions of the activating components, was improved.

I claim:
1. As an additive to thermally curable sulfur-containing high-dienic rubber compositions for improving the processability and shelf life thereof while increasing the curing rate at elevated temperatures, a mixture consisting essentially of 20 to 80 parts by weight of at least one toluenesulfonamide, 10 to 90 parts by weight of hexylene glycol or octylene glycol and 1 to 10 parts by weight of a polypropylene glycol sebacate.

2. The additive defined in claim 1 wherein said toluenesulfonamide is at least one member selected from the group consisting of N-ethyl-o-toluenesulfonamide, N-ethyl-p-toluenesulfonamide, o-toluenesulfonamide, p-toluenesulfonamide and N-cyclohexyl - p - toluenesulfonamide, and mixtures thereof, and said glycol is octylene glycol.

3. The additive defined in claim 2 wherein the sulfonamide is present in said mixture in an amount ranging between 60 and 75 parts by weight, said octylene glycol is present in an amount ranging between 25 and 40 parts by weight, and said mixture contains approximately 5 parts by weight of said polypropylene glycol sebacate.

4. A thermally curable composition comprising a high-dienic elastomer, a curing agent including sulfur, and from 0.5 to 17 parts by weight of an additive mixture per 100 parts by weight of the elastomer, said mixture consisting essentially of 20 to 80 parts by weight of at least one toluenesulfonamide, 10 to 90 parts by weight of hexylene glycol or octylene glycol and to 10 parts by weight of a polypropylene glycol sebacate.

5. The composition defined in claim 4 wherein said toluenesulfonamide is selected from the group consisting of N-ethyl-o-toluenesulfonamide, N-ethyl-p-toluenesulfonamide, o-toluenesulfonamide, p-toluenesulfonamide, and N-cyclohexyl - p - toluenesulfonamide, and mixtures thereof; and wherein said glycol is octylene glycol.

6. The composition defined in claim 5 wherein the sulfonamide is present in said mixture in an amount ranging between 60 and 75 parts by weight, said glycol is present in an amount ranging between 25 and 40 parts by weight, and said mixture contains approximately 5 parts by weight of said polypropylene glycol sebacate.

References Cited

UNITED STATES PATENTS 3,242,125   3/1966   Walker et al. _____ 260—30.8

OTHER REFERENCES

Compounding Ingredients for Rubber (2nd ed.) (India Rubber World) (1947), pp. 225 & 282.

Condensed Chemical Dictionary (6th ed.) (Reinhold) (N.Y.) (1961), pp. 443 and 979.

MORRIS LIEBMAN, Primary Examiner

H. H. FLETCHER, Assistant Examiner

U.S. Cl. X.R.

252—1; 260—31.6, 31.8, 33.4, 761, 783, 814